United States Patent [19]

Weisner

[11] 4,417,818
[45] Nov. 29, 1983

[54] INTEGRATING DENSITOMETER

[76] Inventor: Ralph M. Weisner, 6447 Farralone Ave., Canoga Park, Calif. 91303

[21] Appl. No.: 233,785

[22] Filed: Feb. 12, 1981

[51] Int. Cl.³ .......................... G01J 3/40; G01J 3/48; G03B 27/72
[52] U.S. Cl. .................................. 356/404; 356/418; 355/35
[58] Field of Search ............... 356/419, 418, 404, 405; 355/35, 38

[56] References Cited

U.S. PATENT DOCUMENTS

| 2,273,356 | 2/1942  | Holven et al. | 356/406 |
| 2,544,196 | 3/1951  | Varden        | 356/418 |
| 3,304,832 | 2/1967  | Lewis et al.  | 356/419 |
| 3,812,350 | 5/1974  | Szabo et al.  | 250/226 |
| 4,125,330 | 11/1978 | Schild        | 356/416 |
| 4,344,708 | 8/1982  | Tokuda        | 356/404 |

Primary Examiner—Vincent P. McGraw
Assistant Examiner—L. A. Dietert
Attorney, Agent, or Firm—John E. Peele, Jr.

[57] ABSTRACT

An integrating densitometer for comparing unknown values of an integrated color print with reference values of a standard to indicate changes in density and quality and quantity characteristics of color for correcting the values of the unknown to have substantially the values of the reference, the densitometer having a photopic filter before a light sensor, and a master control for biasing simultaneously individually adjustable color controls.

8 Claims, 3 Drawing Figures

INTEGRATING DENSITOMETER

The present invention relates to an integrating densitometer for comparing unknown values of an integrated print with reference values of a standard to indicate the changes in values for causing the unknown print to have approximately the values of the standard. Particularly, the densitometer is a light evaluating device having individual color channel controls and a master control to alter the individual channels simultaneously. A color print based on the information provided by the device should have the required color and density values to be satisfactory.

Photographic printers, particularly those involved in printing color images, have had several difficulties in making "fine" or even "satisfactory" color prints. These difficulties result from the variations which cause the print to be less than the subjective evaluation "fine". Since color prints have several characteristics which must be balanced for "fine" print, density and color balance variations are quite critical. Even after the printer has achieved the "fine" print, prints made from the same negative or slide in a different printing session may vary due to changes in the age and temperature of the chemicals used, the color values of the particular batch of printing paper, aging of the light source of the enlarger, variations in the processing of the film, and differences in the color characteristics of the film from which the print is to be made. Each variation, by itself, can be compensated for by making corrections to the filter pack used to make the "fine" print. However, such variations usually cause the print maker to waste several sheets of print material and the associated chemicals and time before again making a "fine" print. A "satisfactory" print may be less critical but would require the same subjective evaluations.

Several devices have been provided to assist the color printer in making the "fine" print. Typically, such a printer uses a "color analyzer" for evaluating certain characteristics of the exposure and colors in the negative or positive from which the print is to be made. To make the print with an "analyzer", the print maker must make a first "fine" print to provide the reference for making subsequent prints. To make this print, however, requires the maker to make several subjective judgments for the density and color balance of the print to be "ideal".

Using the integrating densitometer of the present invention, the print maker can approach a "fine" print on the first try. The print maker, even if substantially "color blind" can use the information obtained from the instrument to make a "satisfactory" print. Such a "satisfactory" print is distinguished from a "fine" print in that the "satisfactory" print is a characterization of the scene as recorded by the film; whereas a "fine" print may be modified to the subjective view of the scene as visualized by the photographer. Nevertheless, the integrating densitometer eliminates most of the variables in the chain of events from camera to dried print so as to enable a satisfactory print to be obtained with use of minimum time and materials.

As used herein, the term "opaque" refers to print-type image support materials, whether opaque or translucent but enabling viewing by reflection; and "slide" refers to slide-type image support materials whether transparent or translucent but enabling viewing by transmission of light. The opaque image may be printed from both negative or slide image sources.

An object of the present invention is to provide an integrating densitometer usable as a color comparator instrument having a master control electrically connected to individual color channel adjusters wherein the latter are biased by determined amounts to maintain the values within a predetermined spectral envelope.

Another object is to provide an instrument for aiding a color printer wherein the color values of a reference and an unknown can be compared and information provided to enable another print to simulate the characteristics of the reference.

Yet another object of the invention is to provide an integrating densitometer having a photopic filter arranged before the light sensor to cause the output of the sensor to more closely correspond to visual spectral characteristics.

Still another object is to provide an instrument having image stages for enabling positioning of either transparent or opaque image support materials for illumination by a single light source whereby the images thereof can be assessed by a light sensor disposed remotely therefrom.

The foregoing and other objects, features, and advantages of the present invention will become more apparent upon consideration of the following description and the appended claims when considered in conjunction with the accompanying drawings.

Figure 1:
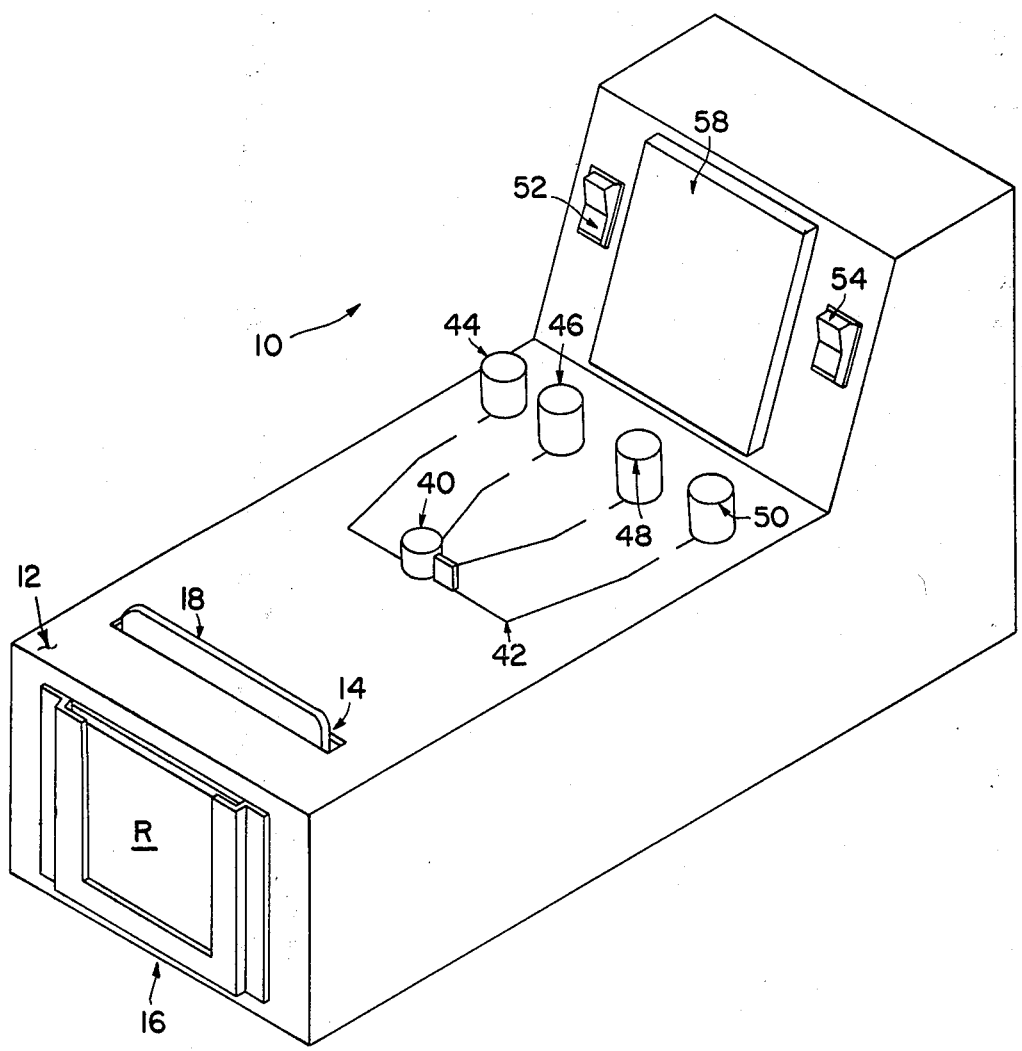
FIG. 1 is a perspective view of the integrating densitometer instrument.
Figure 2:
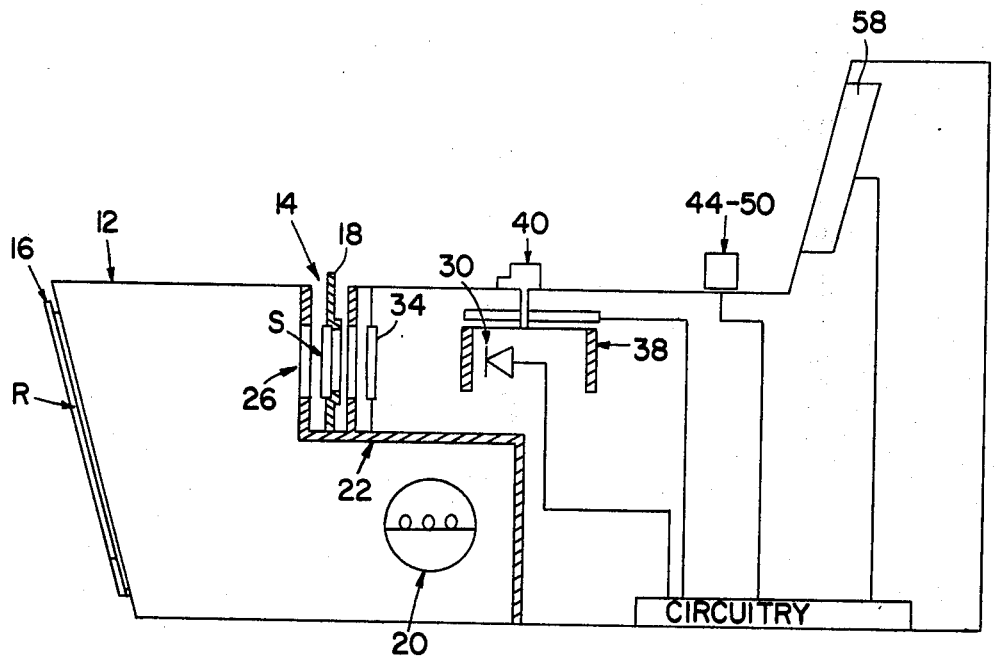
FIG. 2 is a cross-sectional view of the instrument with parts cut-away and parts removed for clarity.
Figure 3:
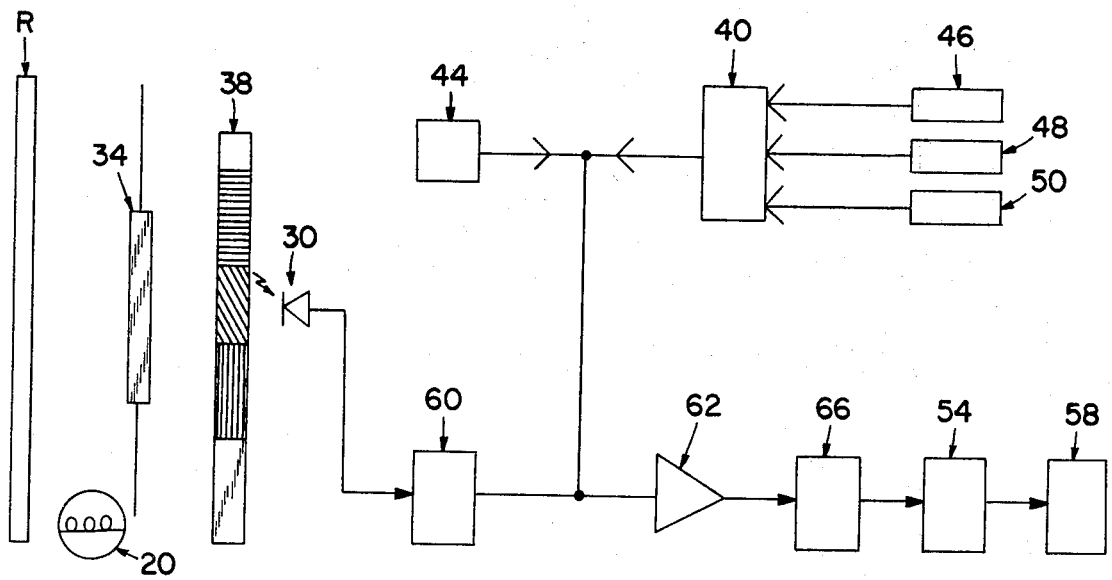
FIG. 3 is a schematic diagram of some primary components and circuitry.

Referring to the drawings, an integrating densitometer 10 functioning as a color comparator instrument is shown having a housing 12 supporting and substantially enclosing a slide stage 14 and an opaque image stage 16. A slide carrier 18 is removably positionable in the slide stage for supporting therein a slide "S". An opague reference standard or print "R" of a predetermined configuration is positionable in the print stage 16. Typically, the reference standard may be an 18% gray card, which represents an average mix of densities and colors in an average natural scene. A light source, shown as bulb 20 is arranged in the housing 12 to illuminate both the slide stage 14 and the opague image stage 16. The slide stage is arranged in a baffle 22 which baffle is positioned to enable a substantially even quantity of light to flood all portions of the opaque image stage, or to be diffused by a reflecting surface in that stage for illuminating the slide stage. The baffle 22 is configured to enable full illumination of the slide stage, but to prevent light rays from the light source 20 from impinging directly on a slide S positioned in the slide stage 14.

The light rays from the light source 20 are reflected from an opaque surface at the opaque image stage 16, and the interior surfaces of the housing 12 to and through the slide stage 14. The lamp 20, the opaque stage and the slide stage are oriented relative to one another to prevent direct reflection of the bulb image to the slide stage even if a highly reflective material is in the opaque stage. An aperture forming gate 26 defines an opening through the slide stage 14 which is dimensioned sufficiently large to accept a transparent image of conventional dimensions. The dimensions permit a full field image of a slide or a full field of a print or reference standard at the opaque image stage to pass along a light path to a light sensor 30, such as a photodectector.

Arranged in the light path between the slide stage 14 and the light sensor 30 is a photopic filter 34. Selected to correct the electrical response of the light sensor 30. substantially to the response of the human eye, the photopic filter modifies the spectral envelope of the light rays impinging on the light sensor, which may be more highly responsive to portions of the visual spectrum than the eye.

Also arranged in the light path between the slide stage 14 and the light sensor 30 is a filter means 38 formed of a plurality of color segments and a clear section. The filter carrier 38 is configured to enable positioning of a selected color segment thereof in the light path. Positioning of the filter means 38 is accomplished by rotation of a multiposition switch device 40 relative to indicators 42 arranged on the housing 12. In this preferred embodiment, the switch device is positionable to orientations which position the filter means for overall density, and readings of either cyan, yellow, or magenta density segments thereof. Further, the switch 40 may include "off" and "standby" positions. Positioning of the switch electrically connects in circuit with the light sensor 30 signal processing circuitry, and appropriate controls, such as potentiometers, defined as a master control 44, and separate, manually adjustable color controls 46, 48, and 50. Other manually positionable controls. shown as rocker switches 52 and 54 are connected in the circuitry to permit selection of either high or low sensor sensitivity and to make possible readings from either positive or negative image origin materials. After processing of the signals from the light sensor 30, the output signal is fed to a display panel 58. The light sensor 30 is connected to a log converter 60 which receives the analog output signal of the detector, and converts that signal to a logarithmic signal. This log signal or voltage is thereafter fed to an opamp or operational amplifier 62, from which the signal is passed to a data scaling and processing circuit 66 for causing the appropriate reference to appear on the display panel 58.

In this preferred embodiment, the panel is a microammeter having a needle displaceable in response to the input voltage from the scaling circuit 66.

The processing circuitry includes the master potentiometer 44 connected in parallel circuit with the log converter 60 and the opamp 62. The voltage level established through the opamp is biased by the master control 44 and the individual color controls 46, 48, and 50. These controls are connected in circuit selectively in response to the orientation of the multiposition switch 40. When in an active color channel selecting position, the switch device energizes the processing circuitry, one of the color controls, and positions in the light path the appropriate segment of filter means 38 for that color channel. Responsive to the light impinging on the light sensor 30, the appropriate output appears on the display 58. Subsequent to adjusting the channel controls 46, 48, 50 respectively, based on a reference standard, substitution of another print at the opaque stage 16 may cause the output voltage to be altered whereby the indicia on display 58 will differ from the reference indicia. In this preferred embodiment, adjustment of the potentiometer of a particular color channel is made up or down to a value for the reference which on the display scale 58 is zero or the null condition. Thereafter, the input by the test print for that channel may be above or below the reference value, causing the display to indicate the direction and quantity of adjustment of that particular value needed to cause the next print to correspond with the reference.

The sensitivity adjusting means or master potentiometer 44 changes simultaneously the output bias level of each of the individual controls 46, 48, 50. As the master control increases or decreases the bias level of each color channel, the values are altered comparably as to the overall color spectrum. Thereafter, adjustment of the color controls start from a slightly different value which has been shifted up or down from the preselected reference. The density control has modified the reference value or delta of the color controls an equal amount, resulting in neutral color value changes rather than a change biased toward any one color. The adjusted value of the density control thus defines one of the four values which together determine the density and color balance of a color print.

When the density control is adjusted, the bias or zero level of the opamp 62 is effectively altered to change the amplitudes of all channels until one color is eliminated from filter pack. Thus, the color values are changed proportionately causing the ratio of the colors to remain the same. That is, the photopic curve is converted to logarithms and is proportionately changed thereby discriminating the color values to enable the instrument to return to the envelope of that curve. Thus, the individual colors may be altered to simulate the values of the reference standard.

Programming of the instrument is accomplished by inserting the reference standard in one of the stages 14 and 16. The meter is then nulled for each of the channels causing the output from the opamp 62 to be effectively 'zero'. Thereafter, upon insertion of the test print to be evaluated, and switching to a preferred channel, the output voltage to the meter may go positive or negative relative to when that channel was nulled for the standard.

The test print is made of an image formed of diffused or integrated light. The diffusion or integration may be caused either by the location of a diffuser between the lens of an enlarger (not shown) and the print material, or before the lens of a camera (not shown). That is, light values of a recorded image are integrated or mixed to a "characterless" but uniform and precise record of density and color of the whole field of the photograph. When a test print is made based on integrated information, that test print will become the reading source for the light reaching the sensor. This test print may have been exposed at reasonable settings of the enlarger or printing device, and processed appropriately. The changes in values determined by the instrument and shown on the display thereof are added to or subtracted from the setting of the corresponding channel of the printing device used to make the test print.

The scale indicia are referenced to identify specific quantities of information to be added to or subtracted from the initial settings of the enlarger. Particularly, the first type of indicia will indicate the required change in overall exposure, if any. The other type of indicia will indicate the required change in units of color for the color channel being evaluated. Thus, both quantitative and qualitative information is made available to the user.

Assuming that the instrument has been adjusted to the color values present in an 18% gray reference standard, and a test print is inserted, which print is either lacking in or excessive of a primary color, the values appearing on the display will be those necessary to cause a print made to those settings to substantially duplicate in quality and quantity the color values of the reference standard.

The test print is evaluated by positioning of the multiposition master switch 40, first, to the density evaluating position. The indicated density change requirements should be made by changing either the exposure time or the aperture opening of the enlarger. Thereafter, the function switch is changed to the color channel which was not used to make the test print. Then, using the density control, the display is nulled thereby eliminating the need to introduce this color into the filter pack of the enlarger. Following this adjustment, the function switch is adjusted to one of the other color channels. The indicia now indicated on the scale represents the change required for that channel of the enlarger. The remaining color channel is next evaluated and the adjustment made on the enlarger. By adjusting the enlarger by the altered values and repeating closely the processing steps and conditions, the values of that print should match the known values, resulting in a "satisfactory" print. The variations caused by changes of the paper emulsion, chemical aging, and temperature variations will have been canceled out in the new print.

It will be apparent from the above description that the invention may be altered, and modifications or substitutions may be made to the instrument without departing from the spirit and scope of the invention.

I claim:

1. An integrating densitometer for evaluating a reference and a photographically processed test print made by a photographing printing system, prior to making another print comprising: a light source; light sensor means; a stage for supporting an image of a reference or the test print as illuminated by said light source wherein said sensor means responds to light rays along a light path as influenced by the image at said stage; a plurality of color filter means movable selectively into the light path between said light sensor means, and said stage for ascertaining at least trichromatic quantity and quality values of the image at said stage; circuitry including means for establishing electrical reference values for the quantity and quality of light impinging on the reference image at said stage for evaluation of said light sensor means, the electrical reference values representing the density and/or trichromatic quantity and quality of the light from the reference image at said stage; and density control means for biasing simultaneously said electrical reference establishing means to shift said trichromatic values proportionately as required to obtain equalization of the density value upon comparison of the reference and test print images wherein the differences in the density and/or the trichromatic values of the reference and the test print are introduced into the photographic printing system to generate another print.

2. An improvement in an integrating densitometer as in claim 1 wherein a photopic filter is arranged before the light sensor means and between the stage to modify light rays from the image as received by said light sensor means.

3. An integrating densitometer as in claim 1 wherein said electrical means are individually adjustable.

4. An integrating densitometer as in claim 1 wherein a first stage is arranged for said light sensor means to receive light rays through a transparent image support, and a second stage wherein said light sensor means receives light reflected from an opaque image support.

5. An integrating densitometer as in claim 1 wherein said density control means and said electrical control means are connected in signal processing circuitry to display information as to the change required to alter the information obtained from an unknown value to simulate a reference value.

6. An integrating densitometer as in claim 1 wherein a photopic filter is arranged between said stage and said light sensor means to modify the spectral content of said light rays impinging on said light sensor means to cause the output of said light sensor means to be electrically shaped to correspond to the visual portion of the electromagnetic spectrum.

7. An integrating densitometer as in claim 1 wherein said light source and said light sensor means are arranged relative to one another at an acute angle wherein said sensor means receives other than direct light rays from said light source.

8. An integrating densitometer as in claim 4 wherein said second stage for opaque image support is angled at less than 90° relative to said light sensor to cause an image support in said stage to reflect direct light rays of said light source to other than said light sensor means.

* * * * *